Nov. 5, 1946.  E. HITZELBERGER  2,410,734
DEVICE FOR MOUNTING ENGINE HOODS ON MOTOR VEHICLES
Filed Oct. 4, 1941  2 Sheets—Sheet 1

INVENTOR
Erwin Hitzelberger,
BY *[signature]*
ATTORNEY

Nov. 5, 1946.    E. HITZELBERGER    2,410,734
DEVICE FOR MOUNTING ENGINE HOODS ON MOTOR VEHICLES
Filed Oct. 4, 1941    2 Sheets-Sheet 2
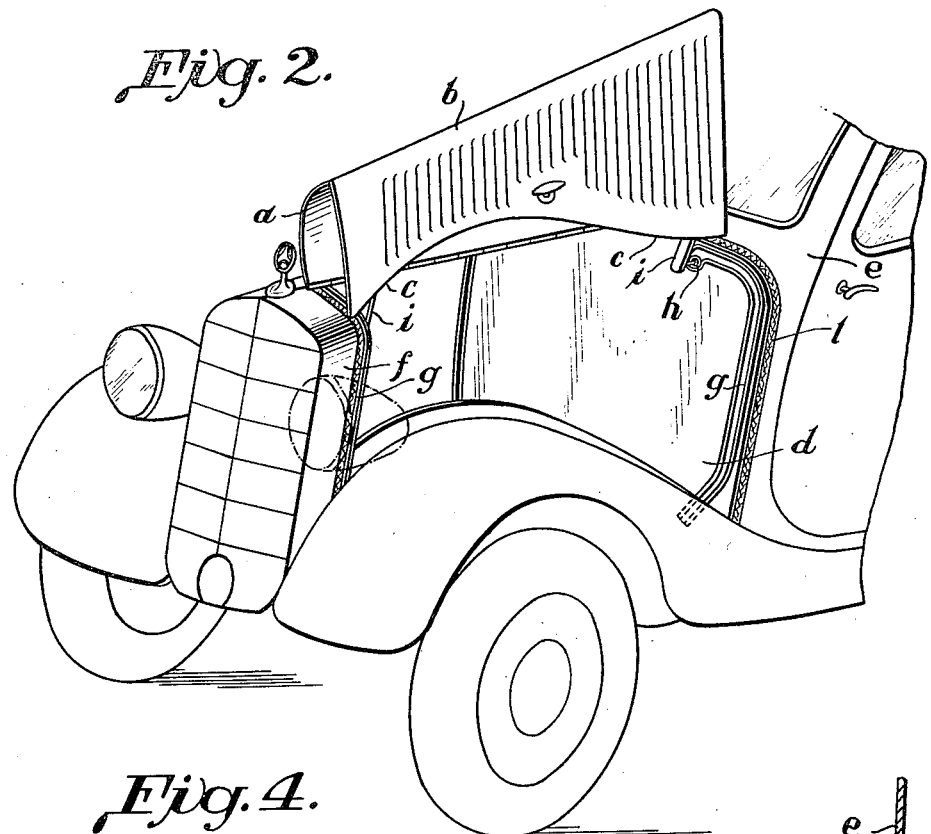
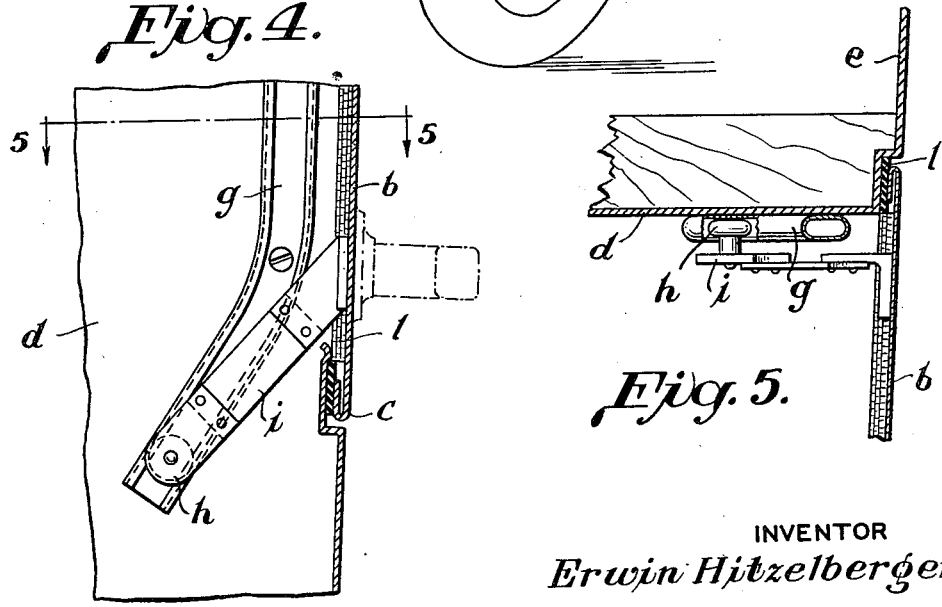
INVENTOR
Erwin Hitzelberger,
BY
ATTORNEY Patented Nov. 5, 1946

2,410,734

UNITED STATES PATENT OFFICE 2,410,734

DEVICE FOR MOUNTING ENGINE HOODS ON MOTOR VEHICLES

Erwin Hitzelberger, Rohr, Germany; vested in the Alien Property Custodian

Application October 4, 1941, Serial No. 413,658
In Germany April 25, 1940

2 Claims. (Cl. 180—69)

The present invention relates to a device to be used in connection with motor vehicles and adapted to prevent damage to mud guards, headlights and other members of the carriage body of motor vehicles during opening and closing of engine bonnets provided with a plurality of bonnet members hingedly connected to each other.

With regard to the clefts present due to the mud guards and headlights and owing to their low own stability, these relatively large and substantially unstiffened engine bonnets may, with much trouble only, be brought into and out of their position of rest without striking against members of the carriage body so that in a relatively short period of time the members of the carriage body lying in the range of the swinging movement of the engine bonnet are scratched and consequently subjected to a rapid corrosion.

The engine bonnets, which are now known, are formed in sections displaceable longitudinally of the vehicle, and cannot overcome this trouble, because such motor bonnets, besides requiring an unnecessary additional space, due to stresses, particularly twisting stresses of the vehicle body, occurring on account of unevennesses of the track or road, very soon loose their exact guidance and jam during opening and closing. Moreover, the slightest damage to the motor bonnet is sufficient to render them immovable.

Relatively to the known devices, the novelty of the present invention consists in positively guiding in a curved way the free ends of freely swingably hinged parts of the motor bonnet. According to a further modification of the invention the corners of the freely swingably hinged parts of the engine bonnet are guided by the aid of projections by rails arranged at the body of the vehicle and defining the swinging range of the bonnet free of obstacles. These projections may be non-resilient and provided with axially displaceable rollers.

In the accompanying drawings the invention is shown by way of example.

Figure 1:
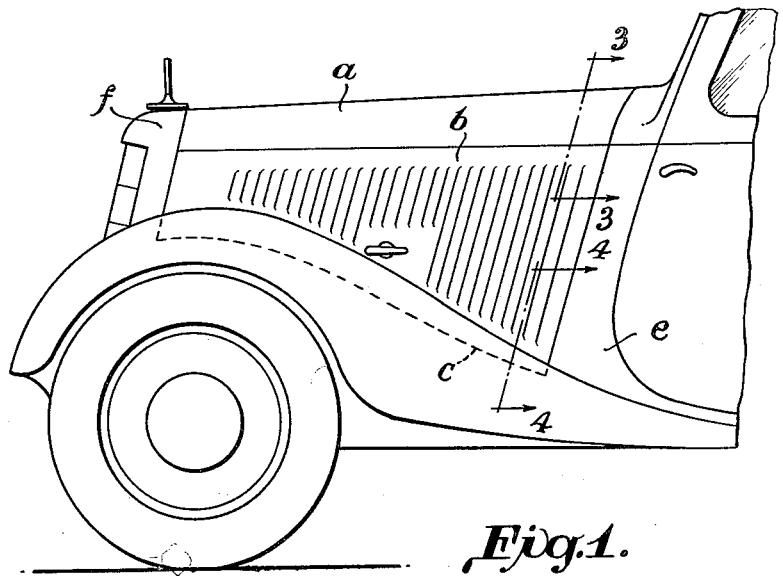
Figure 3:
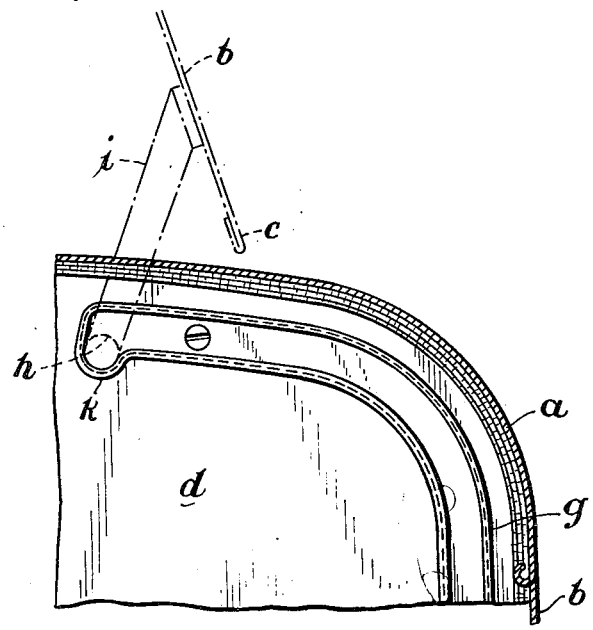

In these drawings:

Fig. 1 is a side elevation of the front portion of a motor vehicle,

Fig. 2 shows a perspective view of the front portion of a motor vehicle illustrating the positively guided engine bonnet in the open position, Fig. 3 is a cross section on the line 3—3 in Fig. 1 through the motor bonnet showing in elevation the upper end of the guide rail, Fig. 4 is a cross section on line 4—4 of Fig. 1 through the motor bonnet illustrating in elevation the lower guide rail slightly bent towards the motor, and Fig. 5 is a cross section on the line 5—5 of Fig. 4 through the guide rail shown in Fig. 4.

To prevent damaging of the mud guards, headlights and the like during opening and closing of motor bonnets provided with a plurality of hingedly connected bonnet members $a, b$, the free ends $c$ of the freely swingably arranged members $b$ of the engine bonnet are positively guided. According to the construction shown in Fig. 2 the positive movement of the bonnet members is effected by arranging at both sides of the engine bonnet, at the front wall $d$ of the carriage body $e$ and at the side of the radiator $f$ facing the motor, hollow rails $g$ in which run the rollers $h$ mounted on the projection $i$ fixed to the free ends $c$ of the freely swingably hinged members $b$ of the engine bonnet.

The rails $g$ are so arranged that during opening and closing of the bonnet the members of the latter are prevented from striking against any of the members of the carriage body.

As shown in Figs. 2 and 3 a supporting notch $k$ is provided at the upper end of the rails $g$ into which drops the roller $h$ carried by the projection $i$ when the bonnet is opened so that the latter is kept in the opened position. As illustrated in Fig. 4, the lower end of the rails $g$, however, is slightly bent in the direction of the motor, whereby pressing of the bonnet members $a$ and $b$ against their supporting points $l$ in the closed position of the bonnet is ensured.

As, however, the rails $g$ provided at the same side of the engine bonnet, due to the different shapes of the bonnet, do not always extend parallel to each other, the projections $i$ are resilient in the direction of gauge alteration, see Fig. 5. This resiliency, however, may also be obtained in connection with rigidly arranged projections $i$ by the fact that the rollers, eventually loaded by springs, may be axially displaced which, however, is not shown in the drawings.

Within the scope of the invention, links pivoted to the vehicle body and hingedly connected to the members of the engine body and which eventually are loaded by springs may be provided instead of the guide rails mentioned above.

In a further form of construction, links, preferably spring loaded, are provided at suitable points on the vehicle, i. e. two points near the front and rear of the bonnet and on the upper part of it, e. g. on the radiator and on the front wall of the carriage body.

Having now particularly described and ascertained the nature of my said invention and in what manner the same is to be performed I declare that what I claim is:

1. In a device to be used with a hinged hood for the engine of a motor vehicle provided with a radiator, to prevent damage to the parts of the vehicle adjacent the hood during opening and closing of the hood, the combination of a pair of trackways adjacent each side of the hood, one trackway of each pair being mounted on the vehicle body rearwardly of the hood, and the other trackway of each pair being mounted on the radiator of the engine forwardly of the hood; rollers mounted on the ends of the two outer edges of the hood, and received in said trackways, respectively; and sills on the vehicle body between the lower ends of the pair of trackways on each side of the body, respectively, each trackway being disposed substantially vertically and having at its upper end a socket in which its roller is seated when the hood is open, and at its lower end a portion curving inwardly from the outer edge of the body, whereby the rollers in the trackways press the lower edges of the hood against the sills when the hood is closed.

2. In a hood for a vehicle having a motor and a radiator, the combination of a set of bonnet members hingedly connected to one another on axes parallel to the longitudinal axis of the vehicle, mounted on the vehicle above the motor, and extending outwardly from said axis, the outer edges of the members on the outer sides of said hood being positioned closely adjacent the outer sides of the vehicle, respectively, when the hood is closed; a roller mounted on each end of each of said outer edges; a pair of vertically extending trackways adjacent each outer side of the vehicle, one trackway of each pair being mounted on the body of the vehicle rearwardly of the hood, and the other trackway of each pair being mounted on the radiator forwardly of the hood, in which trackways the rollers are mounted, respectively; and a sill on each side of the vehicle body extending between the trackways of each pair, which sills the said outer edges contact, respectively, when the hood is closed, each trackway being provided at its upper end with a socket in which its roller is seated when the hood is open, and provided at its lower end with a portion curving toward said axis, whereby the rollers in the trackways press the said edges against the sills when the hood is closed.

ERWIN HITZELBERGER.